United States Patent Office 2,877,354
Patented Mar. 10, 1959

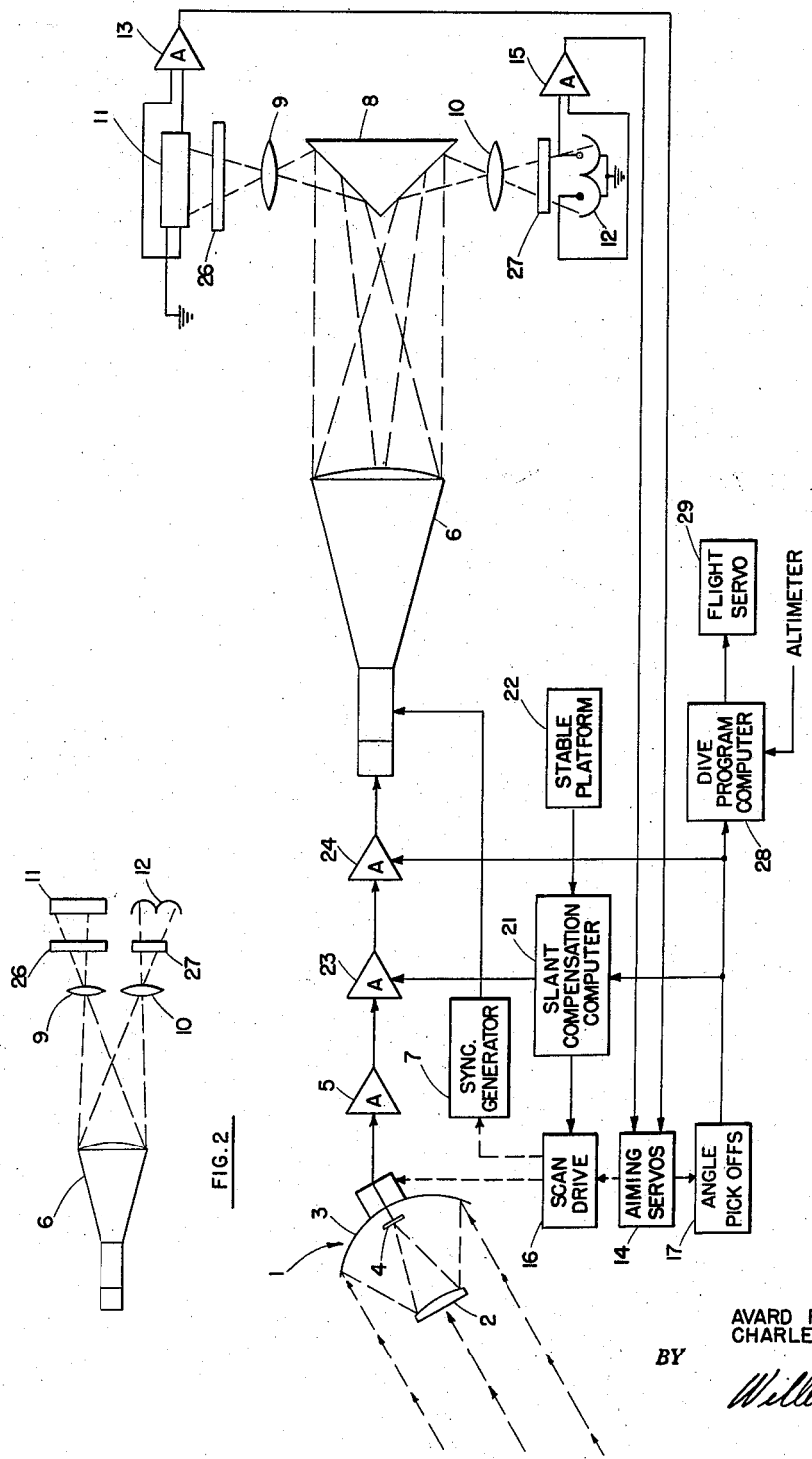

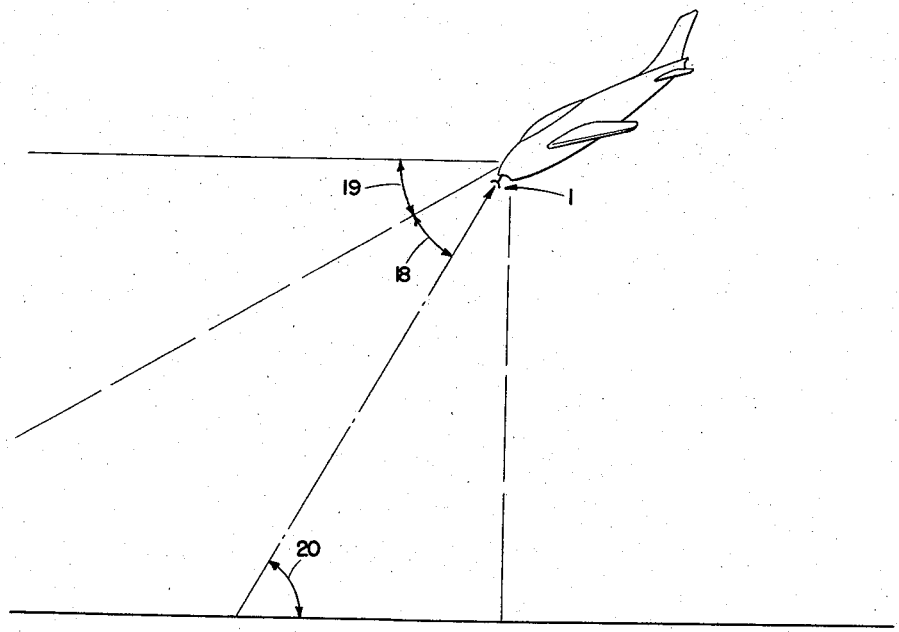
FIG. 3
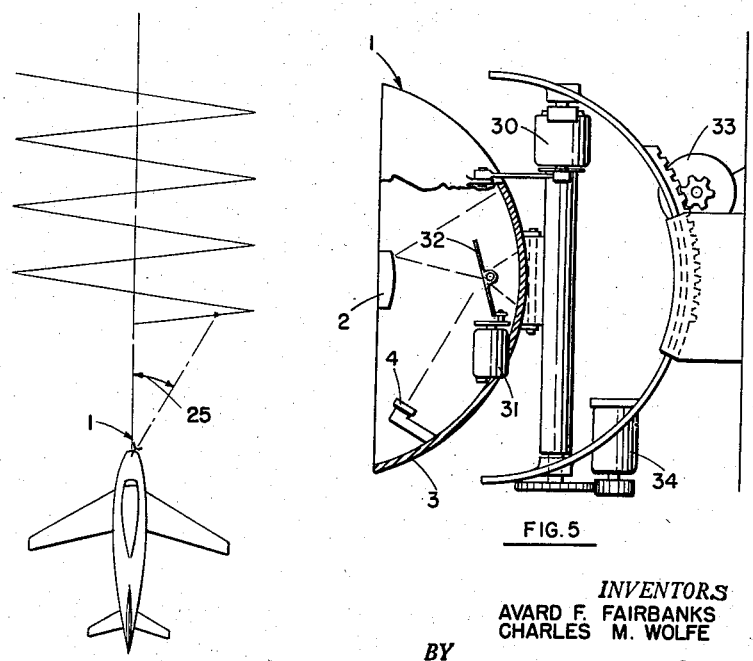
FIG. 4
FIG. 5
INVENTORS
AVARD F. FAIRBANKS
CHARLES M. WOLFE
BY *William R. Lane*
ATTORNEY

2,877,354

RADIATION TRACKER FOR AIMING AT CENTER OR CENTROID OF MULTIPLE TARGETS

Avard F. Fairbanks, South San Gabriel, and Charles M. Wolfe, Glendora, Calif., assignors to North American Aviation, Inc.

Application August 14, 1953, Serial No. 374,382

14 Claims. (Cl. 250—203)

This invention relates to devices for homing on or tracking sources of radiant energy and, in a particular instance of the invention, heat and heat centroid tracking.

A common type of tracking device provides an airborne receiver detector scanning a circular field of view on the ground. Such a scan requires elliptical rather than circular motion in order to evenly scan a circular field on the ground, when the scanner is anywhere but directly over the area scanned. The amount of ellipticity varies with changes in the altitude and attitude of the device and requires continual compensation. Such a scan is difficult to accomplish, but is desirable in order that sources of equal energy be equally scanned.

Another difficulty arises in a radiation tracking device as it approaches a ground based target from horizontal flight. The differences in slant range to targets in the upper and lower portions of the scan result in different intensities from targets of the same magnitude, consequently, the device favors nearer targets. This is also true to a lesser degree with right and left portions of the scan, or lateral ranges. A permanent compensation cannot be made by inserting optical wedges or combs in the receiver beam because, if correct in one attitude of flight, upon diving or assuming a new attitude, this compensation would be in error. Attitude as used here refers to the pertinent angles between the direction of travel of the device and the viewed area and also between the position of the device and the viewed area.

A system of scan which is broomlike and covering a rectangular area is much easier to compensate in range. The errors in slant range may be partially compensated for by variable gain amplifiers. For example, a voltage inversely proportional to the depression angle at which the receiver views the earth determines the gain given to the signal and amplification is thus proportional to range. In this way, targets appear in their true relative intensities and not as a dependent of range.

It is desired, at times to track the heat centroid of an area, rather than heat center. One modification of the invention renders this possible.

It is therefore an object of this invention to provide a radiation homing or tracking device.

Another object of this invention is to provide a tracking device which compensates for differences in slant ranges and differences in lateral ranges to radiant sources in the field of view.

It is another object of this invention to provide a device which will determine the center or centroid of radiation in a field of scan.

It is another object of this invention to provide a tracking device which compensates for dive angle.

A still further object of this invention is to provide means for tracking the radiation center or centroid of an area.

Other objects of invention will become apparent from the following description taken in connection with the accompanying drawings, in which Fig. 1 is a block diagram of the invention;

Fig. 2 is an alternate arrangement of the optical portion;

Fig. 3 is an elevation view indicating pertinent scanning angles;

Fig. 4 is a plan view of a scan; and

Fig. 5 shows one method of detector mounting and drive.

Referring now to Fig. 1, receiver detector 1, consisting essentially of a lens 2, a reflector 3, and an element sensitive to radiation 4 scans a radiant field in a zig-zag pattern, a broom scan, and also oscillates in depression angle at a slower rate. The signal is amplified in signal amplifier 5; and, after receiving certain range compensations hereinafter described, is impressed upon an oscilloscope 6 whose deflection plates are connected to the synchronizer 7 in order that the vertical and horizontal electron sweep of the tube be synchronized with the sweep, or scan, of the receiver detector. Such synchronization between antenna and oscilloscope is common practice in the radar art. By adjustment of the persistency of the oscilloscope, a complete picture of the scanned area is presented, indicating both intensities and relative positions of energy sources. Mirror 8 reflects the oscilloscope image in two directions, to lens 9 and lens 10, for focusing upon double photocell 11 and double photocell 12, respectively. The faces of double photocells 11 and 12 are disposed in parallel planes but their centerlines lie at right angles to each other. Thus, the visual presentation is halved vertically by the dividing line of double photocell 11 and horizontally by the dividing line of double photocell 12. In a slightly different embodiment, the image may be focused upon photocells 11 and 12 as shown in Fig. 2.

The signal from one half of double photocell 11 is compared in magnitude with the signal from the other half of photocell 11. The difference of the two currents obtained from one double photocell is thus proportional to the radiation intensities viewed by one half compared with those viewed by the other half. Differential amplifier 13 amplifies the difference of the outputs of each half of double photocell 11 (or their sums, if connected negatively), and drives the vertical aim portion of aiming servo 14. If the radiation intensities are evenly distributed in both vertical halves of the oscilloscope, the current from each photocell of double photocell 11 is equal and opposite, their difference being zero. In such a case, the receiver detector 1 would be aimed at the vertical centerline of radiation. Differential signals are similarly taken from each half of double photocell 12, indicating the difference in radiation between horizontal halves of the field of view, differential amplifier 15 amplifying it, and driving the horizontal aim section of aiming servo 14. Conventional amplifiers which receive signals to be added to each other are termed "summing" amplifiers. If the polarity is reversed on one of the input signals, that signal is subtracted instead of added and the amplifier is termed a "differential" amplifier. Conventional amplifiers 13 and 15 are connected to receive signals in this manner. Referring now to Fig. 5, in which the scan drive and aiming servos are shown, oscillation of the radiation detector for lateral sweep is produced by scan drive motor 30. Forward scan by the detector is produced by scan drive motor 31 oscillating mirror 32. The elevation aiming according to the signals of the double photocell 12 is accomplished by aiming servomotor 33, and the azimuth aiming according to double photocell 11 is accomplished by aiming servomotor 34. This method of mounting and driving is presented only for example. Several well known scanning systems are compatible with superimposed aiming such as is illustrated. Servomotors 33 and 34 are null seeking servos. As a result, they will point detector 1 in azimuth and elevation, at the heat center, which is the only point where the output of both double photocells is null.

In reiteration, servomotor 34 drives the detector 1 in azimuth until each half of photocell 11 is viewing equal radiation on oscilloscope 6 and servomotor 33 drives the detector 1 in elevation until each half of photocell 12 is viewing equal radiation. The detector is then pointed at the heat center, by definition.

Angle pickoffs 17, Fig. 1, provide information as to receiver detector depression angle 18, Fig. 3, from the receiver detector gimbals to slant compensation computer which, when combined with information of dive angle 19, received from the stable platform, gives an earth incidence angle 20 from which correction for slant range can be determined. Gyro verticals or other commonly known vertical indicators can be used in the place of stable platform 22 to indicate airframe dive angle. Suitable angle pickoffs to indicate the angles between the radar antenna and the airframe are illustrated in Radiation Laboratory Series vol. 1, Radar System Engineering, p. 486 et seq. wherein they are termed "Angle Data Transmitters."

In order to provide a field sweep which is uniform in width, an even swath, provision must be made so that the lateral sweep of the receiver detector 1 depends on its earth incidence angle. If aimed far out front, the lateral sweep angle is smaller than if aimed more directly downward. Slant compensation computer 21 takes depression angle information from angle pickoffs 12 and dive angle information from stable platform 22 and computes the sine of the earth incidence angle which provides necessary change in lateral sweep and passes the information to the scan drive 16. Resolvers and other devices which compute trigonometric functions of given angles are well-known.

Slant compensation computer 21, after receiving depression angle information from angle pickoffs 17 and dive angle information from a reference such as a stable platform 22, or any device which indicates local level, computes the necessary slant range compensation and transmits this to variable gain amplifier 23. This computation involves simply determining the sine of the earth incidence angle 20 which is the sum of angles 18 and 19 which information is provided to the computer. The gain of amplifier 23, receives from computer 21, then, a signal which varies inversely with the sine of the depression angle of the receiver detector from horizontal, and thus compensates for slant ranges and prevents different intensities from targets of same magnitude but of different range.

Variable gain amplifier 24 receives information as to lateral angle 25, Fig. 4, from pickoffs 17 (taken from receiver detector gimbals) and compensates therefor. Energy magnitudes of different ranges (within the field of scan) are thus presented more accurately and the tracking device is not so prone to favor the nearest radiation. The original oscilloscope presentation is therefore, after compensation, a true relative picture in magnitudes as well as in position.

In order to provide heat centroid tracking, it is necessary to add together all intensities times their respective distance from a center line of the field of view and generate a signal accordingly. In front of photocells 11 and 12 are placed optical density wedges, 26 and 27, disposed to be darkest along the double photocell centerline, making each intensity viewed by the photocells proportional to the distance of the intensity from the centerline. It is desirable that the density wedges do not refract or interfere with the passage of light therethrough, except to make the amount of light passed through dependent on its distance from the double photocell centerline. The two currents from each double photocell are thus proportional to the summation of every intensity times its distance from the centerline. The other double photocell produces two currents, similarly proportional to the summation of intensity times distance about the other centerline, and there will be no resultant error voltages when the radiation centroid is at the intersection of the vertical and horizontal centerlines. The embodiment shown is a "passive" type tracking device (i. e. the radiant energy is supplied solely by the target) as contrasted with "active" tracking devices such as radar which generate their own radiant energy and receive the reflections thereof. The device can be adapted for use with active systems if so desired.

Without wedges 26 and 27, the device is a heat center tracker.

If flight is to be programmed also in accordance with the received signals (homing), a dive program computer 28 operated directly from angle pickoffs 17 may furnish signals to flight control device 29. These devices represent an autopilot control device which flies the aircraft in accordance with the angle of the scanning detector.

Radiation sensitive element 4 determines, of course, which frequency of radiant energy will be tracked.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In combination, a scanning detector sensitive to radiation, means for amplifying the signal output of said detector as it scans an area, means for presenting the amplified radiation signals, means responsive to said amplified radiation signals for positioning said detector, and means responsive to the position of said detector for compensating said signals in accordance with the displacement of said detector from a predetermined reference position whereby range compensation of said detector signal output is made.

2. A passive radiant energy tracking device comprising a scanning detector sensitive to radiation of scanned objects, an amplifier connected in circuit with said detector, aiming means responsive to the amplified signal output of said amplifier for positioning said detector, and means responsive to said aiming means for varying the magnitude of said amplified signal in accordance with the range of each radiating object as said object is scanned, said device including means for visually presenting the signal output of said amplifier.

3. In combination, a scanning detector sensitive to radiation, a variable gain amplifier in circuit with said detector, means for visual presentation of the amplified signal from said detector, photosensitive means for viewing said visual presentation, aiming means for said detector responsive to the output of said photosensitive means, means providing information as to the depression angle of said detector to said variable gain amplifier, and means providing information as to the lateral angle of said detector to said variable gain amplifier whereby slant range and lateral range compensation of the signal of said detector may be made.

4. The combination recited in claim 3 wherein said means for visual presentation of the amplified signal is an oscilloscope whose beam sweep is synchronized with the sweep of said detector.

5. In combination, a scanning detector sensitive to radiation, a first variable gain amplifier, a second variable gain amplifier, both in circuit with said detector, an oscilloscope connected to receive the output of said second amplifier, means synchronizing the beam sweep of said oscilloscope with the sweep of said detector for visual presentation of the amplified signal from said detector, first photosensitive means for viewing vertically divided portions of said visual presentation, second photosensitive means for viewing horizontally divided portions of said visual presentation, means for amplifying the difference in output of each photosensitive means viewing vertical portions and means for amplifying the difference in output of each photosensitive means in viewing horizontal portions, aiming means for said detector responsive to the output of said photosensitive means so as to aim for minimum differential signals, means for providing information as to the depression angle of said detector to said first variable gain amplifier, and means for providing information as to the lateral angle of said detector to said second variable gain amplifier whereby slant range compensation and lateral range compensation of the signal of said detector may be made.

6. A scanning detector sensitive to radiation, means for amplifying the signal of said detector, a variable gain amplifier for slant range compensation of said signal and a variable gain amplifier for lateral range compensation of said signal, an oscilloscope connected to receive the signal compensated by said variable gain amplifiers, means synchronizing the beam sweep of said oscilloscope with the detector sweep for visual presentation of the amplified and compensated signal, photosensitive means for viewing said oscilloscope, means for amplifying the signal from said photosensitive means, aiming means responsive to the amplified signal of the photosensitive means, lateral angle pickoff means associated with said detector controlling the gain of said variable gain amplifier for lateral range compensation, and depression angle pickoff means associated with said detector controlling the gain of said variable gain amplifier for slant range compensation.

7. The combination recited in claim 6 wherein said photosensitive means comprise two double photocells, the centerline of one so arranged to divide the visual presentation into halves in one direction and the centerline of the other so arranged to divide the visual presentation into halves in another direction.

8. A scanning detector sensitive to radiation, means for amplifying the signal of said detector, a variable gain amplifier for slant range compensation, a variable gain amplifier for lateral range compensation of said signal, an oscilloscope synchronized in beam sweep with the detector sweep for visual presentation of the amplified and compensated signal, photosensitive means comprising two double photocells arranged to view said oscilloscope, the dividing lines of said photosensitive cells being disposed at right angles to divide the picture at right angles, means for amplifying the difference in current output of adjacent halves of each of the double photocells, aiming means responsive to said amplified difference in current output so as to aim said detector for a minimum differential signal, lateral angle pickoff means associated with said detector controlling the gain of said variable gain amplifier for lateral range compensation, and depression angle pickoff means associated with said detector for controlling the gain of said variable gain amplifier for slant range.

9. The combination recited in claim 8 wherein optical means is inserted between said oscilloscope and said double photocells.

10. The combination recited in claim 9 wherein is included a density wedge situated preceding each double photocell.

11. The combination recited in claim 9 wherein said optical means comprises a double mirror reflecting said double presentation in two directions, a lens situated in each reflected path, a density wedge also situated in each reflected path preceding each double photocell.

12. In combination, a heat detector, two variable gain amplifiers for compensation for slant range and lateral range in circuit with said heat detector, an oscilloscope connected to receive the output of said variable gain amplifiers and visually present the sources of heat energy scanned by said detector, optical means dividing said visual presentation along two axes, double photosensitive means disposed in each axis for viewing and dividing said visual presentation at right angles, a differential amplifier connected to receive the output of each double photosensitive cell and determine the difference between each half, means for driving said heat detector to scan, means for synchronizing the beam sweep of said oscilloscope with the scan of said heat detector, aiming means for driving said heat detector according to the differential signal of said photosensitive means so as to seek a minimum signal, pickoff means indicating the depression angle of said heat detector, pickoff means indicating the lateral angle of said heat detector, and computer means adapted to receive information as to dive angle and depression angle of said heat detector and control the gain of one of said variable gain amplifiers and to compensate for slant range whereby said detector scans an even swath.

13. In a radiation tracking device a detector sensitive to radiant energy, means for amplifying the signal of said detector, means for reproducing visually the relative intensities of energies detected and their spatial relationship, a double photocell positioned to view and split in half the reproduced radiant field, another double photocell positioned to view and split in half at right angles to said first double photocell the reproduced radiant field, a differential amplifier associated to amplify the difference in output between each pair of double photocells, aiming servos responsive to the output of said differential amplifier which act to drive said detector for a minimum differential signal.

14. In a passive radiant energy tracking device a scanning detector sensitive to radiation, a signal magnitude compensator in circuit with said detector, means for visual presentation of the signal from said detector, aiming means for said detector responsive to said signal, means providing information as to the depression angle of said detector to said compensator, and means providing information as to the lateral angle of said detector to said compensator, whereby slant and lateral range compensation of the signal of said detector may be made.

References Cited in the file of this patent

UNITED STATES PATENTS

| | | |
|---|---|---|
| 2,237,440 | Jones | Apr. 8, 1941 |
| 2,403,975 | Graham | July 16, 1946 |
| 2,439,294 | Hammond | Apr. 6, 1948 |
| 2,451,917 | Chilowsky | Oct. 19, 1948 |
| 2,459,293 | Shonnard | Jan. 18, 1949 |
| 2,583,173 | Hargens | Jan. 22, 1952 |
| 2,602,922 | Maynard et al. | July 8, 1952 |